Patented July 12, 1932

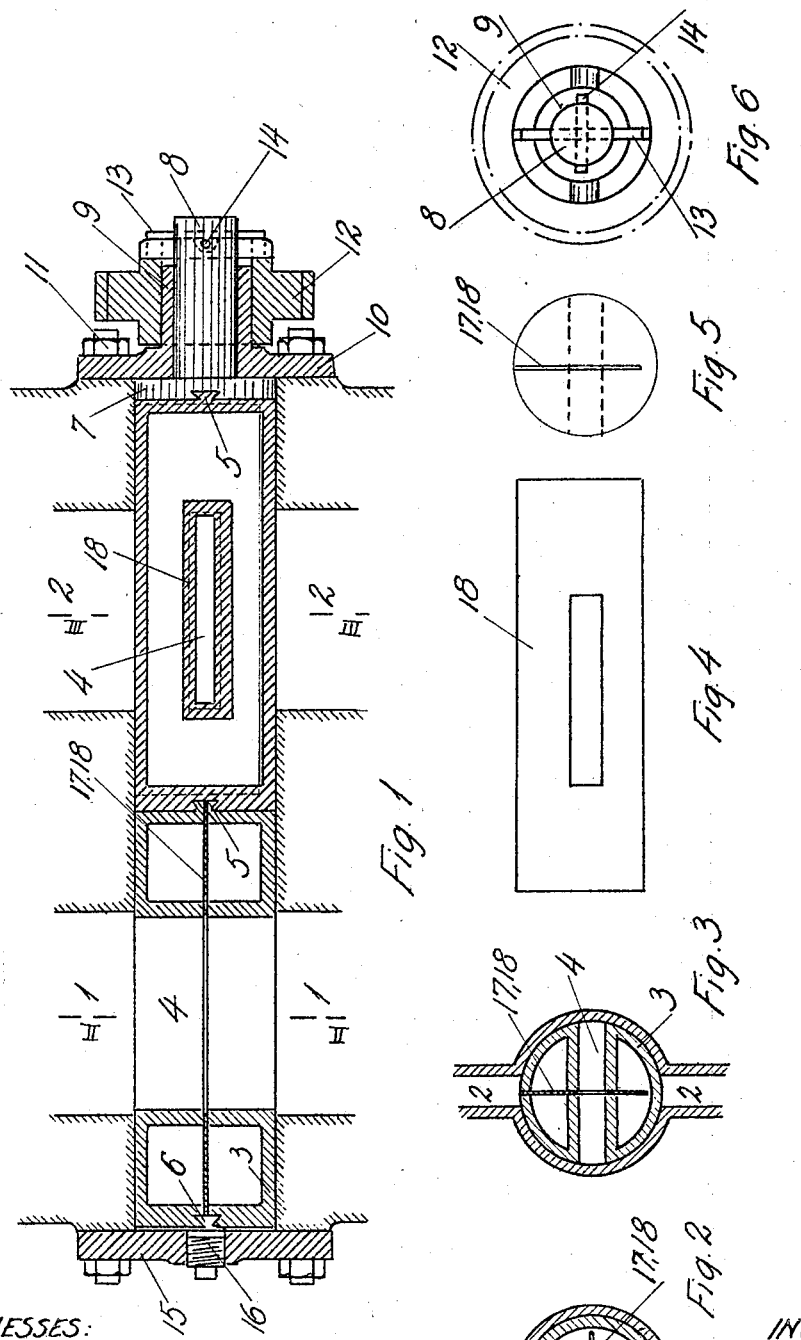

1,867,235

UNITED STATES PATENT OFFICE

JOHAN THORKILDSEN, OF STAVANGER, NORWAY

ROTARY VALVE

Application filed November 10, 1930, Serial No. 494,647, and in Norway June 8, 1929.

The present invention relates to rotary valves, more particularly for internal combustion engines. It is known in connection with rotary valves for internal combustion engines to make the valves of several axially alined sections corresponding to the number of cylinders served by the valve, the sections being detachably connected together at the ends. This end connection of the valve sections is preferably effected by providing the valve sections at one end with a groove preferably of dovetail section, and at the other end with rib or projection of corresponding section. In assembling the section members the sections are slid into one another, the rib or projection at the end of one section engaging the corresponding groove of the adjacent section. This arrangement also enables the sections to be easily detached when the valves are removed from the housings for careful inspection. The section elements are in this type of valve, usually provided with diametrically extending passages or ports for the supply of the explosive fuel mixture and for the discharge of the exhaust gases. By the provision of a diametrically extending exhaust passage the advantage is attained that as the exhaust gases pass in a straight line direct through the valve section into the exhaust tube, the valve section will be heated only to a very slight extent.

It is the object of the present invention to improve the tightness of the joint between a valve section and the housing or valve seating in such a manner as to make the tightness and pressure between the valve and the surrounding seating or housing material as far as possible independent of the temperature and the expansion caused by the rise of temperature. This object is, according to the invention, attained by making the valve sections elastic or resilient by the provision of one or more slots which extend from one side of an element almost to the other side. The slots extend over the whole length of the section, that is, they extend also through the end walls or faces of the valve sections. Into each slot is inserted a plate preferably made of elastic or resilient material for the purpose of preventing oil from entering the interior of the valve section and also in order to prevent leakage of gas, more particularly exhaust gas, from one element to an adjacent element. These insertion plates, which preferably extend diametrically into the sections, must, of course, be provided with openings corresponding to the passage or ports provided in the sections so as to enable the fuel mixture or the exhaust gases to pass through the valve.

The accompanying drawing shows by way of example one construction embodying the features of the invention.

Fig. 1 is an axial section through a rotary valve having two valve sections and intended for use with a two-cylinder engine, and the adjacent portions of the valve seating or housing.

Fig. 2 is a section on line II—II of Fig. 1.

Fig. 3 is a section on line III—III of Fig. 1.

Fig. 4 is a detail elevation of an insertion plate.

Fig. 5 is an end view of a valve section with the insertion plate, and

Fig. 6 is a detail end view of part of a valve operating gear.

Referring now to the drawing and more particularly to Fig. 1, 3, 3 indicate two adjacent valve sections rotatable in holes or bores of the cylinder head of the two-cylinder engine. 1, 1 and 2, 2 are the ports of the rotary valve for gas, for supply of the explosive mixture or gas, respectively the ports of the rotary valve for the exhaust gases, for the discharge of the exhaust gases. The valve sections are constructed as hollow cylinders formed with diametrically extending passages or ports 4. The passages 4, 4 in the adjacent sections are angularly displaced relatively to each other according to the number of cylinders of the engine, for instance with two cylinders the passages 4 will be displaced by an angle of 90°, whereas with four cylinders the angular displacement will be 45°. Each valve section is, in the construction shown, formed with a diametrically extending slot 17 which extends over the whole length of the section and consequently also through the end walls of the section. The slot is indicated by the numeral 17 and in the construction shown is arranged at right angles to the direction of the passage 4 of the valve in question. Into the port 17 is inserted a plate 18 preferable of resilient material. The plate has an opening corresponding to the section of the passage 4 as best shown in Fig. 4. The adjacent valve sections are, as above stated connected by being formed one section with a dove-tailed rib 5 and the adjacent section with a corresponding groove 6. The grooves 6 and ribs 5 preferably extend diametrically. The outer and driven section of the valve has a similar dove-tail shaped rib 5 which engages a similarly shaped groove of a flange 7 of a short driving shaft or pin 8. The shaft 8 is rotatably mounted in a socket bearing 9 fixed to the cylinder head by means of a flange 10 and screw bolts 11. The bearing socket 9 serves at the same time as a journal pivot for a driving gear 12 which is loosely mounted on the socket 9 and is driven by another gear not shown. The gear 12 is connected with the the shaft 8 by means of a key 13 which is passed through notches of the gear 12 and a corresponding slot in the shaft 8 and is fixed to the latter shaft by means of a pin 14. This arrangement of driving gear has the advantage that the main stresses are received by the socket 9 and that no bending or lateral stresses are transmitted to the rotary valve. It will be understood, however, that if preferred the valve may be driven by other means than those shown. The opposite end of the valve bore is closed by a cover 15 fixed by screw bolts. This cover is provided with a central opening which is closed by a screw plug 16 provided with a square projection. The screw plug can be easily unscrewed and serves to enable a key to be inserted into the groove 6 in the end wall of the adjacent valve section by means of which the valve may be turned by hand during the fitting operation. The slot 17 may be produced in any suitable manner, for instance during the casting operation.

I claim:

1. A rotary valve, more particularly for internal combustion engines, comprising a cylindrical valve section formed with a valve port and with a slot extending over the whole length of the valve section, and a plate inserted into said slot, substantially as and for the purpose described.

2. A rotary valve, more particularly for internal combustion engines, comprising a hollow cylindrical valve section formed with a diametrically extending port and provided with a diametrically extending slot which extends at right angles to the direction of the said passage and over the whole length of the valve section, and a plate inserted into said slot, said plate being provided with an opening corresponding to the cross section of the said passage, substantially as described.

Signed at Stavanger, Norway, this 28th day of October, 1930.

JOHAN THORKILDSEN.